United States Patent

Fernando et al.

(10) Patent No.: US 6,397,240 B1
(45) Date of Patent: May 28, 2002

(54) PROGRAMMABLE ACCELERATOR FOR A PROGRAMMABLE PROCESSOR SYSTEM

(75) Inventors: John Susantha Fernando, Coopersburg, PA (US); Stefan Thurnhofer, Newport Beach, CA (US)

(73) Assignee: Agere Systems Guardian Corp., Miami Lakes, FL (US)

( * ) Notice: Subject to any disclaimer, the term of this patent is extended or adjusted under 35 U.S.C. 154(b) by 0 days.

(21) Appl. No.: 09/252,500

(22) Filed: Feb. 18, 1999

(51) Int. Cl.[7] .............................. G06F 7/00; G06F 7/50
(52) U.S. Cl. ...................... 708/603; 708/708; 708/709
(58) Field of Search ............................... 708/523, 524, 708/520, 607, 603, 622, 620, 629, 630, 700, 708, 709; 712/221, 222

(56) References Cited

U.S. PATENT DOCUMENTS

| | | | | |
|---|---|---|---|---|
| 5,884,069 A | * | 3/1999 | Sidwell ...................... | 712/221 |
| 5,953,241 A | * | 9/1999 | Hansen et al. .............. | 708/501 |
| 5,983,257 A | * | 11/1999 | Dulong et al. .............. | 708/603 |
| 6,035,316 A | * | 3/2000 | Peleg et al. ................. | 708/523 |

* cited by examiner

Primary Examiner—Chuong Dinh Ngo
(74) Attorney, Agent, or Firm—Ryan, Mason & Lewis, LLP

(57) ABSTRACT

A programmable multi-mode accelerator is disclosed for use with a programmable processor or microprocessor. The programmable multi-mode accelerator allows a programmable processor to execute specific algorithms, such as certain types of finite impulse response (FIR), correlation and Viterbi computations, that require low-precision operations at an extremely high rate. The accelerator extends the digital signal processor's performance into the required range for low-precision computations. The accelerator can be coupled with the main data path of a programmable processor or microprocessor and can directly read and write to the main register files of the programmable processor. In an illustrative implementation, the accelerator data path accesses its input values (source operands) directly from a main register file of the programmable processor and writes results back into a second main register file. The accelerator allows a plurality of low-precision algorithms requiring primarily addition or multiply-add computations, such as finite impulse response, correlation and Viterbi computations, to utilize the same adder cells. The accelerator includes a multi-mode adder that can be programmatically reconfigured to perform various addition computations. In a first mode, referred to as the "single-add mode," the adder operates as a 17-input 16-bit adder. The single-add mode can be utilized to perform finite impulse response and correlation computations. The second mode, referred to as the "ACS mode," can be utilized to perform Viterbi computations. The accelerator has a small instruction set and instruction memory and, once started by the main data path, the accelerator executes its own instruction stream. In addition, the accelerator includes a delay line having delays of $z^{-1}$ or $z^{-2}$.

61 Claims, 12 Drawing Sheets

| CYCLE | ACTIVITY |
|---|---|
| 1 | DELAY CHAIN ADVANCES BY ONE NEW VALUE IS READ FROM MAIN REG. FILE NEW VALUE IS WRITTEN INTO dr0 |
| 2 | 8 ACC. REGISTERS ARE READ AND APPLIED TO MUL INPUTS DELAY CHAIN VALUES ARE APPLIED TO MUL INPUTS VALUES ARE MULTIPLIED |
| 3 | MUL OUTPUTS ARE ADDED UP WITH OR WITHOUT THE FEEDBACK INPUT |
| 4 | ADDER OUTPUT IS WRITTEN BACK TO THE MAIN REG. FILE |

| CYCLE | ACTIVITY |
|---|---|
| 1 | 2 ACC. REGISTERS ARE READ, SIGN EXTENDED 2 MAIN REGS ARE READ VALUES ARE ADDED |
| 2 | ADDER RESULTS ARE COMPARED AND MINIMUM/MAXIMUM VALUES ARE SELECTED |
| 3 | AC RESULTS ARE WRITTEN TO MAIN REG. FILE ARP IS UPDATED |

FIG. 11

| $\bar{S}_D$ | $\bar{S}_C$ | $\bar{S}_B$ | $\bar{S}_A$ |   |   |   |   |   |   | $C_D$ | $C_C$ | $C_B$ | $C_A$ |
|---|---|---|---|---|---|---|---|---|---|---|---|---|---|
| D | D | D | B | B | A | A | A | A | A |   |   |   | A |
| 1 | D | D | C | C | B | B | A | A | A |   |   | B | 0 |
| 0 | D | D | C | C | B | B | B | A | A |   |   | 0 | $C_B$ |
|   | 1 | D | C | C | B | B | B | B | A |   | C | 0 |   |
|   | 0 | D | D | C | C | C | B | B | A | 0 | $C_C$ |   |   |
|   |   | 1 | D | C | C | C | C | B | A |   |   |   |   |
|   |   | 0 | D | D | C | C | C | B | A | $C_D$ |   |   |   |
|   |   |   | 1 | D | D | C | C | B | A |   |   |   |   |
|   |   |   | 0 | D | D | D | C | B | A |   |   |   |   |

FIG. 12

PROGRAMMABLE ACCELERATOR FOR A PROGRAMMABLE PROCESSOR SYSTEM

FIELD OF THE INVENTION

The present invention relates to programmable processor systems, such as digital signal processor systems, and more particularly, to methods and apparatus for achieving high processing rates, required for certain algorithms currently achieved only by dedicated hardware.

BACKGROUND OF THE INVENTION

Currently available digital signal processors are highly programmable, but they do not provide sufficient performance for many applications, since the digital signal processor is optimized for a data width of 16 bits or higher precision. Thus, to achieve the higher processing rates required for certain algorithms, which require more than an order of magnitude beyond the capabilities of commercially available digital signal processors, a number of digital signal processor systems, such as receivers in a wireless local area network (LAN) or a wideband CDMA network, have implemented such algorithms in dedicated application specific logic or in dedicated coprocessors. Specifically, algorithms requiring low-precision and relatively high data rates, such as certain types of finite impulse response (FIR), correlation and Viterbi computations, have been implemented in such application specific integrated circuits (ASICs) or coprocessors.

For example, in a typical Wireless LAN channel matched filter performing FIR computations, approximately 500 million multiply-add calculations (MACs) per second are required. Meanwhile, the required input and output precision for such FIR computations is only five bits and nine bits, respectively. Likewise, in a wireless LAN correlator, the incoming bit stream must be correlated with the original Barker code sequence, in a well-known manner. Such correlation computations require about 900 million multiply-add calculations (MACs) per second. Since the Barker code is only a one-bit sequence (with each value being either +1 or −1), the multipliers implement relatively simple operations. Finally, Viterbi decoders in wideband CDMA or IS-95 receivers have increasingly high bit rates and an increased constraint length of the convolutional code. Meanwhile, a branch metric in such a Viterbi decoder can be represented by less than eight bits (even for soft decision decoding) and no more than 32 branch metrics need to be stored for a complete update of the required 256 states.

While application specific integrated circuit (ASIC) and coprocessor implementations efficiently (with low power dissipation) perform such operations at the required data rates, they typically perform only a single function. In addition, since the design and verification of such application specific integrated circuits is often an expensive and time-consuming process, any modifications to an application specific integrated circuit implementation will require a significant amount of time and expense.

As apparent from the above-described deficiencies with current techniques for achieving processing rates required for certain digital signal processor algorithms, a need exists for a programmable and low power accelerator that achieves required processing rates for a number of different algorithms.

SUMMARY OF THE INVENTION

Generally, a programmable multi-mode accelerator is disclosed for use with a digital signal processor, microcontroller or microprocessor. The term "programmable processor" is used herein to collectively refer to a digital signal processor, a microcontroller or microprocessor. The programmable multi-mode accelerator allows a programmable processor to execute specific algorithms that require low-precision operations at an extremely high rate, such as certain types of finite impulse response, correlation and Viterbi computations. The disclosed programmable multi-mode accelerator replaces the ASIC implementations that have typically been used in digital signal processor systems and allows for a more programmable and more cost-effective solution. The accelerator extends the digital signal processor's performance into the required range for low-precision computations.

In one implementation, the accelerator begins executing its program after the main decode and dispatch unit of the programmable processor has issued a special start instruction. In such an implementation, the accelerator is coupled with the main data path of a programmable processor. The accelerator optionally has direct access to the register files of the programmable processor. In an illustrative implementation, the accelerator data path obtains its input values (source operands) directly from a set of registers in the programmable processor and writes results back into a second set of registers.

According to an aspect of the invention, the accelerator allows a plurality of algorithms, such as certain types of finite impulse response, correlation and Viterbi computations, to utilize the same adder cells thereby saving silicon area. In particular, the present invention allows low-precision algorithms requiring primarily addition or multiply-add computations to be implemented using a programmable accelerator. Thus, although an illustrative finite impulse response computation requires sixteen eight bit by eight bit multipliers and an adder tree to add the 16 products, and an illustrative Viterbi computation requires eight 16-bit additions and compare-select operations, the present invention allows these computations to be performed using the same adder cells. Thus, in accordance with the present invention, the accelerator includes a multi-mode adder that can be programmatically reconfigured to perform the various operations discussed above.

The multi-mode adder is controlled by the instructions of the accelerator. In a first mode, referred to as the "single-add mode," the adder operates as a 17-input 16-bit adder. In the single-add mode, the adder has 17 16-bit inputs that are all summed to form one 16-bit output. One input is a feedback path and the other 16 inputs come from a multiplexer and a multiplier bank. The single-add mode can be utilized to perform finite impulse response and correlation computations.

In the single-add mode, the illustrative accelerator can implement FIR filters with a delay line having delays of $z^{-1}$ or $z^{-2}$ and with up to 16 taps. In this implementation of the FIR filter, the throughput is one output sample per cycle. In addition, the accelerator can implement a finite impulse response filter with a $z^{-1}$ delay line and with between 17 and 32 taps. In this implementation of the FIR filter, the throughput is one output for each two cycles.

In the single-add mode, the accelerator initially advances the registers in the delay chain by one, reads a new value from the main register file, and writes the value into the first register of the delay chain. In the next cycle, the eight accelerator registers are read and are applied to the inputs of the multipliers in the multiplier bank. In addition, the delay chain values are applied to the inputs of the multipliers in the multiplier bank, and the values are multiplied. Thereafter, the outputs of the multipliers in the multiplier bank are summed by the adder, with or without the feedback input. Finally, the output of the adder is written back to the main register file.

In a second mode, referred to as the "four state add-compare-select mode" (or "ACS mode"), the feedback path is inactive. The other 16 inputs are divided into 8 groups of two inputs each. The two inputs of each group are summed to form eight intermediate 16-bit outputs. The eight intermediate 16-bit outputs are paired and a maximum or minimum from each pair is selected, based on the current operating mode, to produce four values. These four values are concatenated into two 32-bit values and sent back to the register file where results are stored. The ACS mode can be utilized to perform Viterbi computations.

In the ACS mode, the accelerator initially reads two values from the accelerator registers and sign-extends them to an appropriate length. In addition, two of the registers from the main register file where inputs are stored are read and the values are added. The two values are then compared and a maximum or minimum is selected. Thereafter, the results of the adder are written to the main register file and the accelerator register pointer is updated.

The accelerator has a small instruction set and instruction memory and, once started by the main data path, the accelerator executes its own instruction stream. The main processor and accelerator are always synchronized (i.e., in lock step) and no synchronization overhead, such as semaphores or hardware flags, is required, thereby maximizing data throughput.

A more complete understanding of the present invention, as well as further features and advantages of the present invention, will be obtained by reference to the following detailed description and drawings.

BRIEF DESCRIPTION OF THE DRAWINGS

FIG. 11 outlines a representative cycle-by-cycle functioning of the accelerator of FIG. 7 when operating in the ACS mode;

FIG. 12 shows the 4 partial products for an 8×8 radix-4 Booth multiplier;

DETAILED DESCRIPTION

Figure 1:
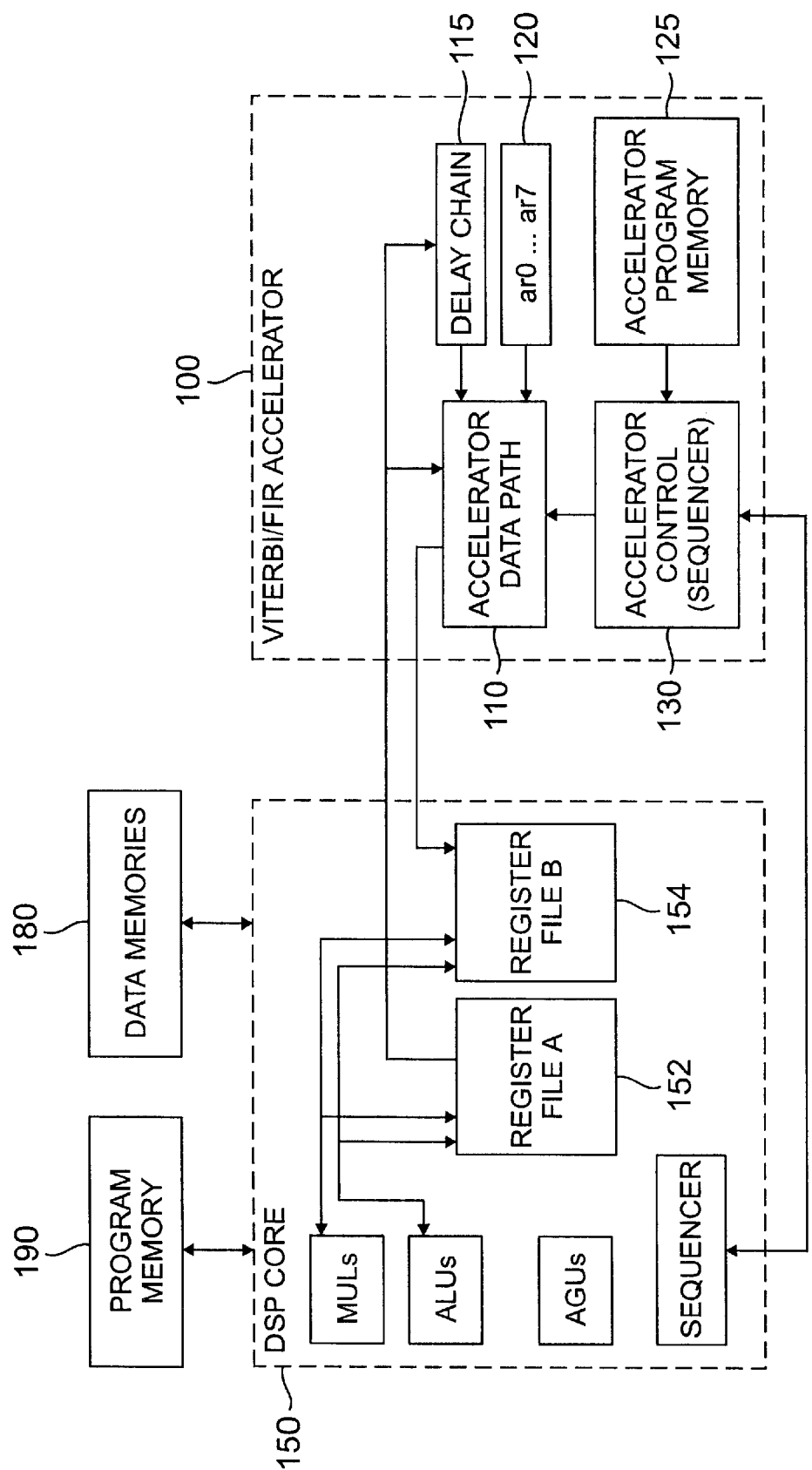
FIG. 1 illustrates a programmable multi-mode accelerator coupled with a programmable processor in accordance with the present invention.

FIG. 1 illustrates a programmable multi-mode accelerator 100 for use with a programmable processor in accordance with the present invention. As shown in FIG. 1, the accelerator 100 is coupled with the main data path of a programmable processor 150. The accelerator 100 has direct access to the main register files 152, 154 of the programmable processor 150. In other words, the accelerator 100 can directly read and write the registers 152, 154. It is noted that although two register files 152, 154 are utilized in the main data path of the illustrative programmable processor 150, one or more register files could be utilized, as would be apparent to a person of ordinary skill in the art.

The accelerator 100 also has its own small instruction set and instruction memory stored in an accelerator program memory 125. Once the accelerator 100 is started by the main data path of the programmable processor 150, the accelerator 100 executes its own instruction stream. According to a feature of the present invention, the accelerator 100 extends the performance of the programmable processor 150 into the required range for high rate and low-precision computations.

In one implementation, the accelerator 100 begins executing its program after the main data path of the programmable processor 150 has issued a special start instruction. Therefore, the exact execution time of the accelerator instructions is known including the time when results are available from the accelerator data path. The accelerator terminates operation by executing an exit instruction.

In an alternate implementation, the register files 152, 154 can be memory-mapped in the memory space of the programmable processor 150 without changing the accelerator 100 function.

The accelerator program memory (APM) 125 is mapped in the main program memory space. The accelerator program memory (APM) 125 is therefore visible to the main data path. The accelerator program memory 125 can be implemented as writable memory, and the main data path can then program the accelerator 100 in real-time. The accelerator program memory 125 could also be implemented as a read-only memory, in which case no dynamic programming is possible. The accelerator program memory 125 may contain several programs, each terminated by an exit instruction. When the main data path starts the accelerator 100, the programmable processor 150 specifies an address in the accelerator program memory 125 at which the accelerator 100 will commence execution.

In the illustrative implementation, the accelerator data path accesses its input values (source operands) directly from the main register file 152. The accelerator 100 may share ports with the functional units of the main data path. Results are written back into the main register file 154. As discussed further below in conjunction with FIGS. 5 and 8, the actual register that is accessed is determined by the destination register pointer (DRP) and source register pointer (SRP) registers of the accelerator 100. The accelerator 100 has no direct access to the main data memory 180.

In a typical scenario, the main data path feeds samples to the accelerator 100 by reading them from memory 180 and writing them into a particular register 152 in the main register file. The accelerator 100 can then read each sample from the register file 152, process the value and write the value back into the main register file 154 (typically a different register).

In one implementation, the main data path and the accelerator are synchronized so that no synchronization overhead, such as semaphores or hardware flags, is necessary. Thus, data throughput is maximized. For data paths of the accelerator 100 and the programmable processor 150 to stay synchronized, the accelerator 100 must freeze when the main data path is interrupted or has to service a trap. Interlocks are also avoided to keep hardware complexity low. This means that, for example, the accelerator 100 has no direct means of testing whether there is a valid sample in the main register file 152 for processing. The programmer (or compiler) must time the instructions correctly and make sure that both data paths stay synchronized. However, all instructions execute in a predetermined number of clock cycles, and the state of both data paths can easily be determined at programming time. The accelerator 100 can therefore be viewed as a non-interlocked functional unit.

When operation is restarted after an interrupt or trap, both data paths need to be in the same state as before. Typically, the main data path will only take interrupts at instruction boundaries and its pipeline gets flushed. It may be necessary that the accelerator 100 flushes some or all of its own pipe stages before halting execution, so that when execution of the program restarts, both data paths resynchronize. Since the accelerator 100 maintains a large amount of state information (especially in the delay chain 115), it would not be practical to make all of the state information architecturally visible to the main data path. Therefore (and also to make resynchronization simpler) the accelerator 100 cannot be used in an interrupt service routine (ISR).

According to a feature of the present invention, discussed below, the accelerator 100 performs a Viterbi computation and a finite impulse response (FIR) computation using the same adder cells. The FIR computation requires sixteen 8×8 multipliers and a deep adder tree to add the 16 products. In contrast, the Viterbi computation requires eight 16-bit additions.

Figure 2:
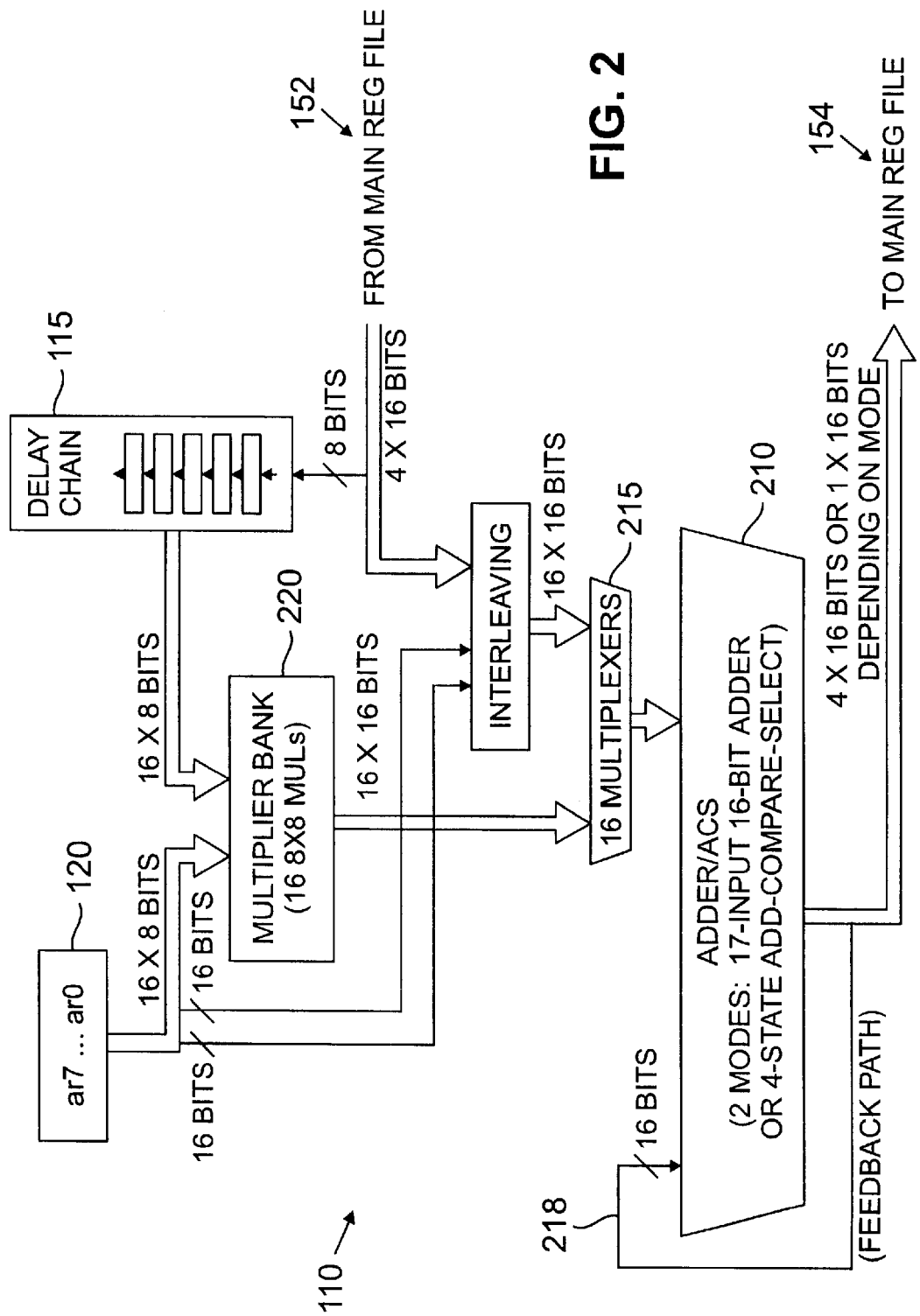
FIG. 2 is a schematic diagram of the accelerator of FIG. 1.

FIG. 2 provides a conceptual representation of the accelerator data path 110. As shown in FIG. 2, accelerator data path 110 includes an adder 210 that operates in one of two modes (controlled by the instructions of the accelerator). Elements in the figures that provide a similar function to elements in other figures are shown with the same reference numeral. In a first mode, referred to as the "single-add mode" and discussed further below in conjunction with FIGS. 3 through 6, the adder 210 operates as a 17-input 16-bit adder. In the single-add mode, the adder 210 has 17 16-bit inputs that are all summed to form one 16-bit output. As shown in FIG. 2, one of the inputs is the feedback path 218 and the other 16 inputs come from a multiplexer 215. The programmer must ensure that the output does not overflow. There is no carry flag that would indicate overflow. As discussed further below, the single-add mode can be utilized to perform finite impulse response and correlation computations.

Figure 8:
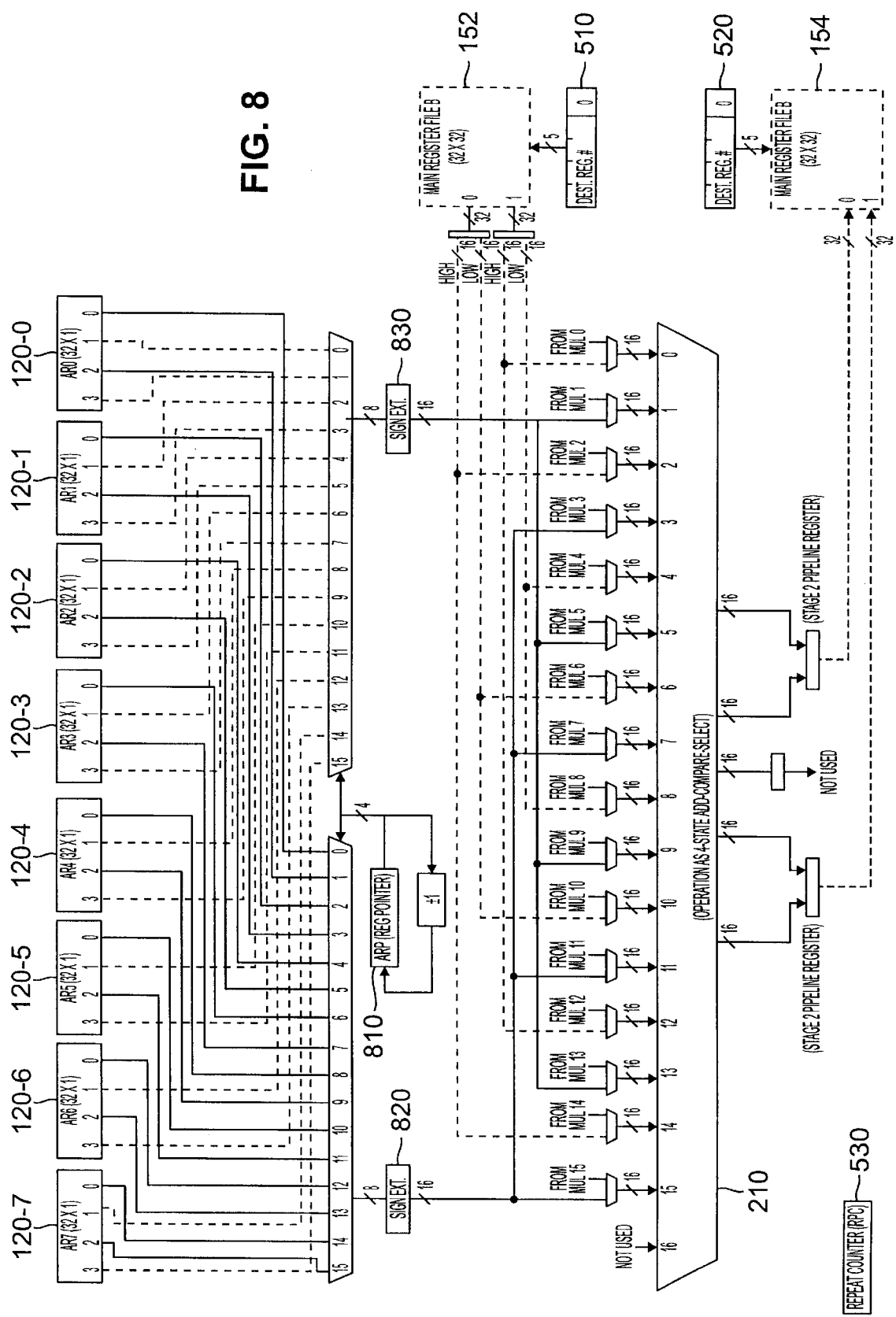
FIG. 8 illustrates the accelerator in the ACS mode of FIG. 7.
Figure 9:
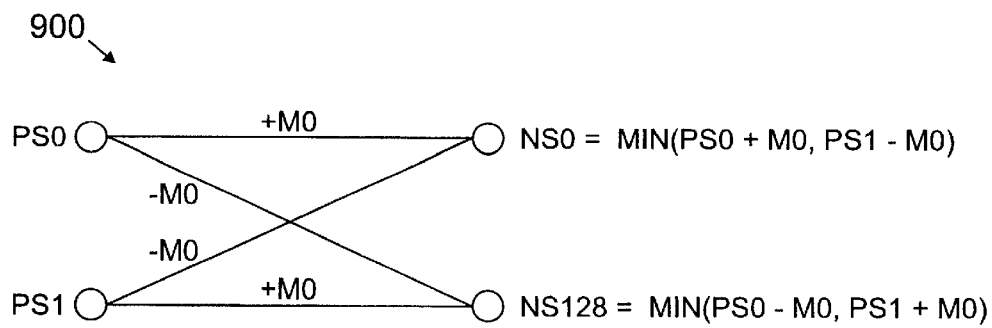
FIG. 9 illustrates a Viterbi butterfly.

In a second mode, referred to as the "four state add-compare-select mode" (or "ACS mode"), discussed further below in conjunction with FIGS. 7 through 9, the feedback path 218 is inactive. The other 16 inputs are divided into eight groups of two inputs each. The two inputs of each group are summed to form eight intermediate 16-bit outputs. The eight intermediate 16-bit outputs are paired and a maximum or minimum from each pair is selected, based on the current mode, to produce four values. These four values are concatenated into two 32-bit values and sent back to the register file 154. Again, the programmer must ensure that the computations do not overflow. As discussed further below, the ACS mode can be utilized to perform Viterbi computations.

As shown in FIG. 2, the accelerator data path 110 also includes the delay chain 115, consisting of a chain of 32 8-bit registers in the illustrative embodiment. The values in the delay chain registers 115 are shifted each clock cycle, from one register to the next. As discussed further below, two shifting patterns are possible simulating a $z^{-1}$ or a $Z^{-2}$ delay chain.

The accelerator data path 110 also includes a set of accelerator registers 120 consisting of eight 32-bit registers ar0 through ar7, in the illustrative embodiment. The accelerator registers 120 are architecturally visible to the core of the programmable processor and can be written by the programmable processor 150 as 32-bit values. Inside the accelerator 100, however, the registers 120 are accessed as 32 8-bit values. The accelerator registers 120 would typically hold values that do not change rapidly, such as the branch metrics for Viterbi decoding or the Barker code sequence for Wireless LAN correlation computation, as discussed below.

Figure 3:
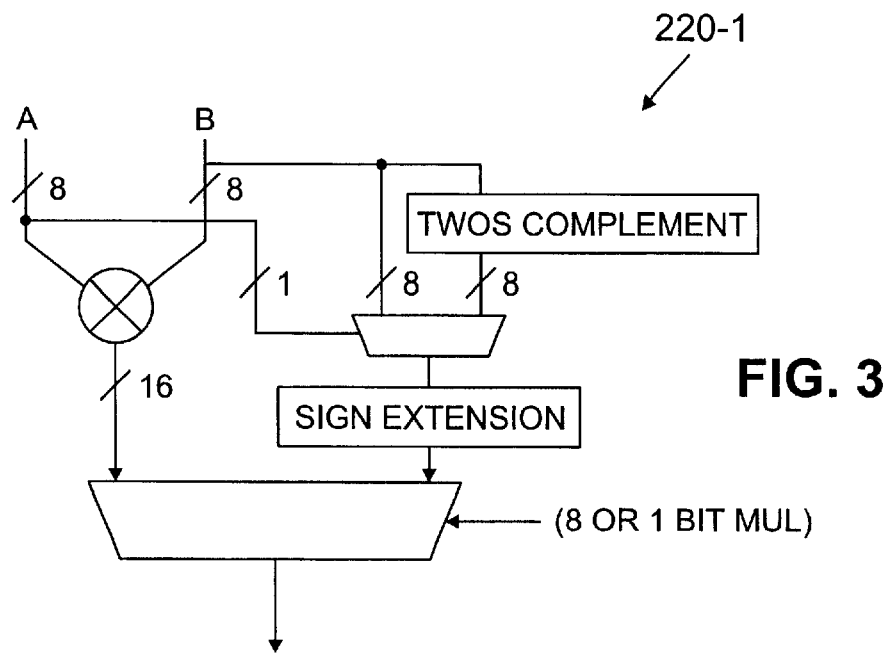
FIG. 3 is a block diagram of a multiplier in the multiplier bank of FIG. 2.

The accelerator data path 110 also includes a multiplier bank 220 consisting of a group of 16 multipliers, each with two 8-bit inputs and one 16-bit output. In some applications, such as correlation with Barker code in the WaveLAN® product, commercially available from Lucent Technologies Inc., one of the multiplier values is either +1 or –1. Thus, to save power in these cases, each multiplier 220-N in the multiplier bank 220 can be designed as shown in FIG. 3. As shown in FIG. 3, bit 0 of value A indicates +1 or –1 and the multiplier 220-1 is bypassed by a simple circuit that passes either B or –B to the output. As discussed below, the multiplexer and clock to the multiplexer are controlled by bits in an instruction.

SINGLE-ADD MODE

Figure 4:
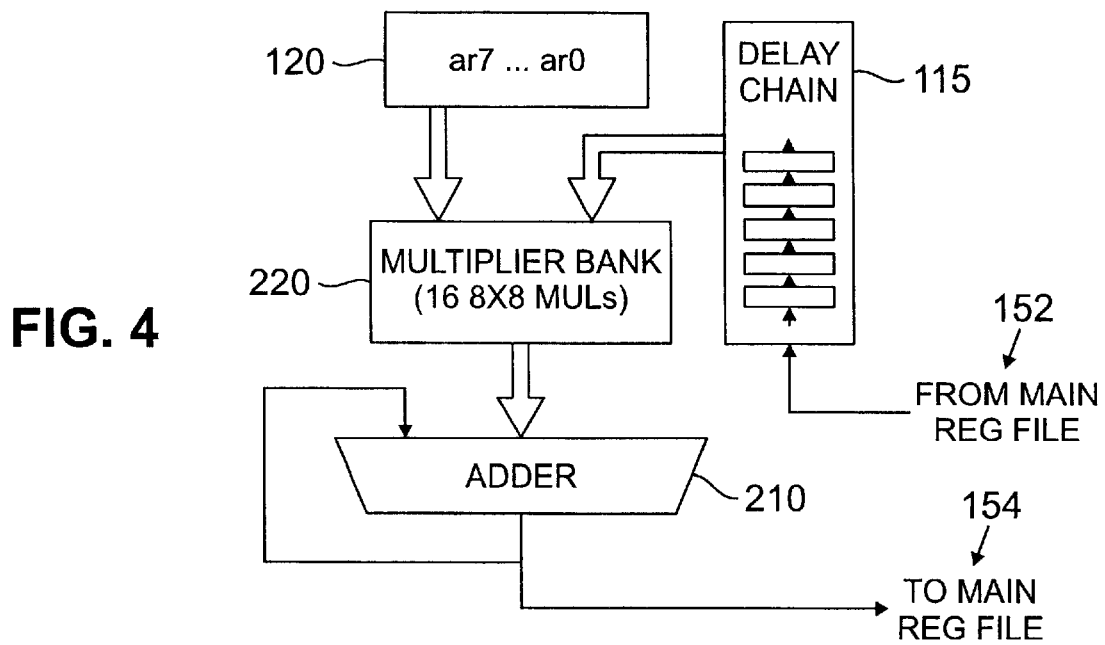
FIG. 4 illustrates a block diagram of the accelerator in a single-add mode, in accordance with the present invention.
Figure 5:
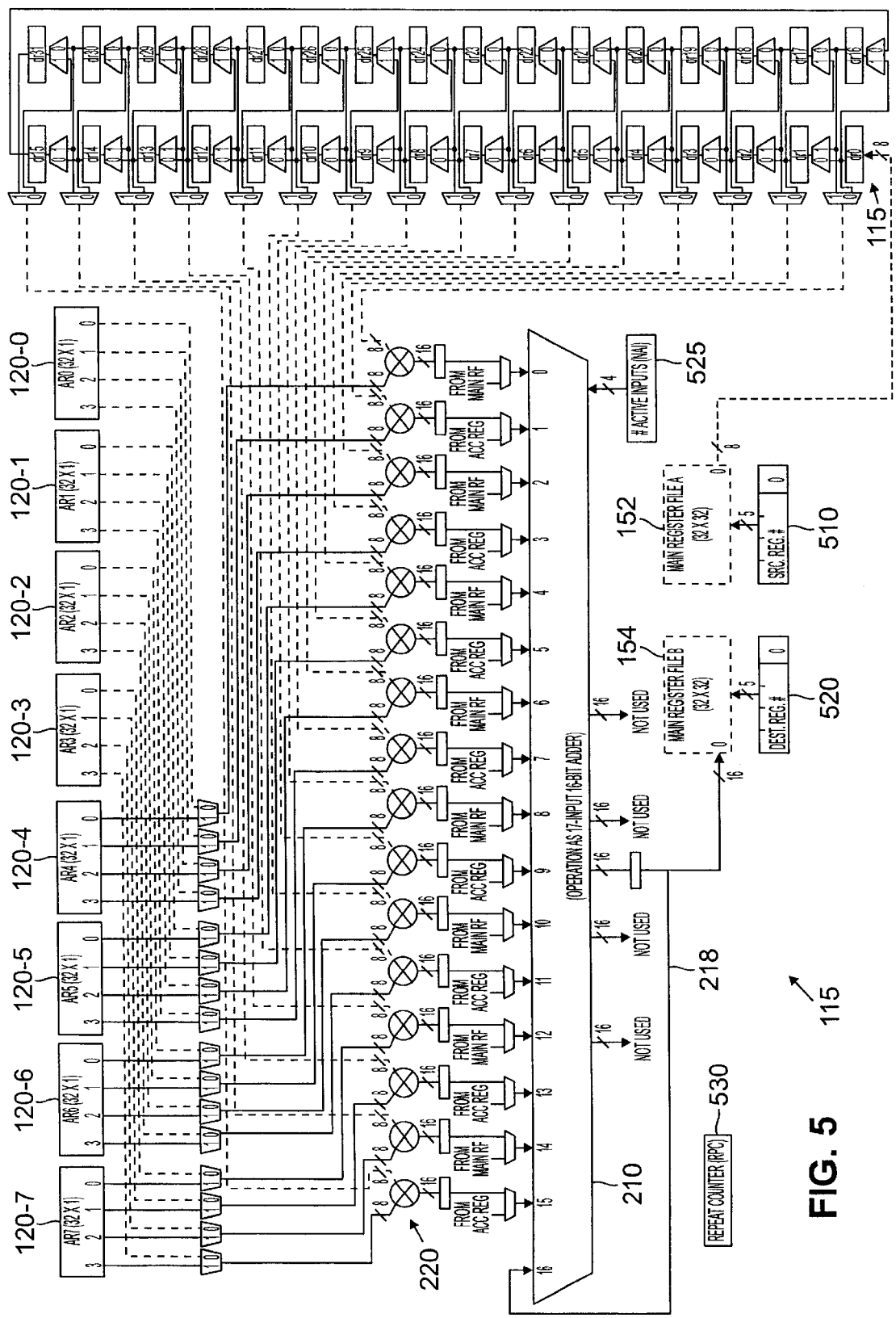
FIG. 5 illustrates the accelerator in the single-add mode of FIG. 4.
Figure 13:
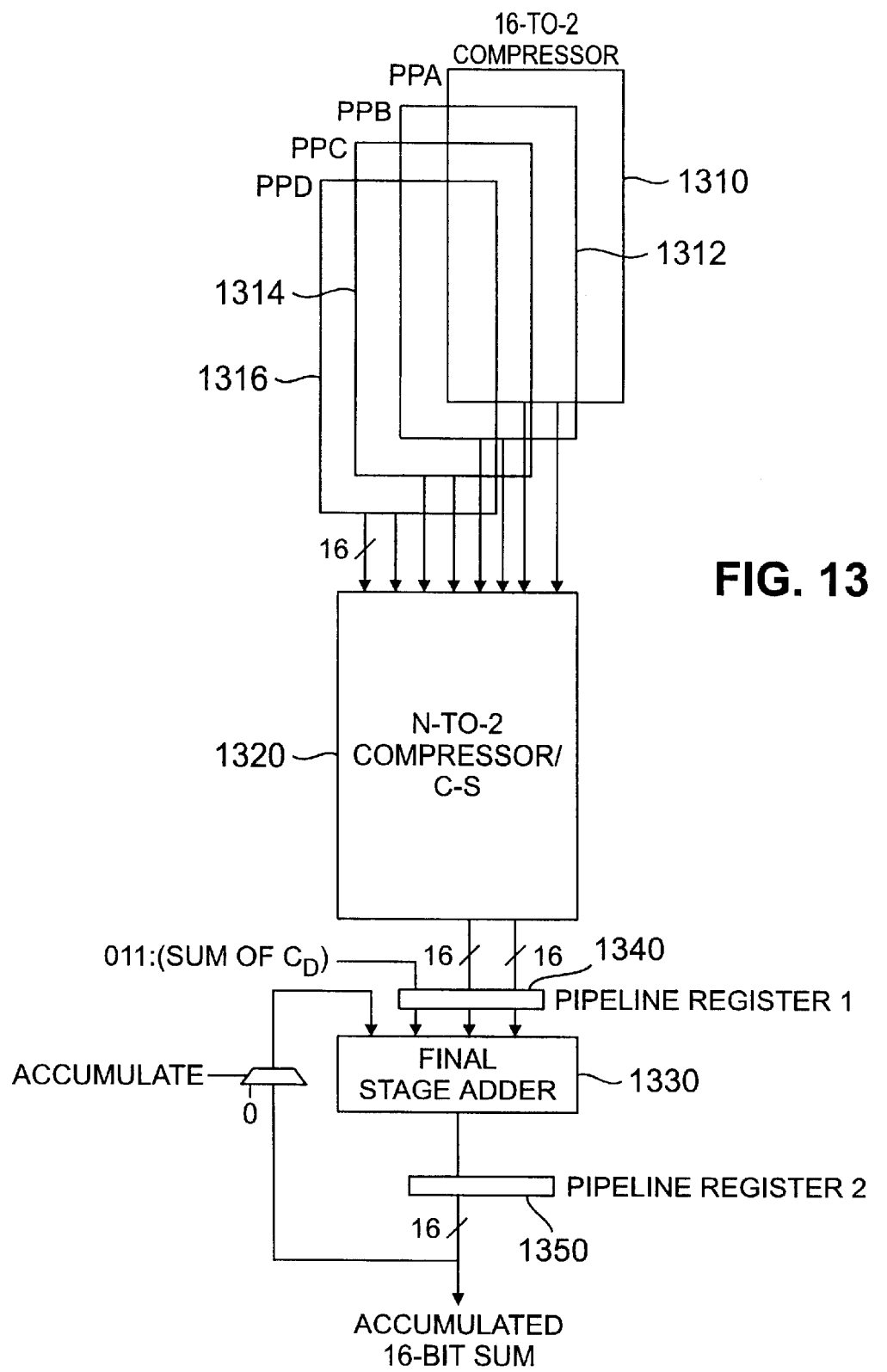
FIG. 13 illustrates a multi-mode adder for the reduction of partial products from 16 8×8 multipliers.

FIG. 4 shows a conceptual diagram of the accelerator 100 in the single-add mode, with only the portions of the accelerator 100 that are active in the single-add mode illustrated. While FIG. 4 is simplified to illustrate the concepts more clearly, a complete block diagram of the accelerator 100 in the single-add mode is shown in FIG. 5. Although shown as separate components in FIG. 5, the multiplier and adder are implemented as shown in FIG. 13.

In the single-add mode, the accelerator 100 can implement FIR filters with a delay line having $z^{-1}$ or $z^{-2}$ delays and with up to 16 taps. In this implementation of the FIR filter, the throughput is 1 output sample per cycle. In addition, the accelerator 100 can implement an FIR filter with a $z^{-1}$ delay line and with between 16 and 32 taps. In this implementation of the FIR filter, the throughput is 1 output per 2 cycles.

To realize a length-M FIR filter defined by the following equation:

$$y_n = \sum_{i=0}^{M-1} h_i \cdot x_{n-i} = h_0 \cdot x_n + h_1 \cdot x_{n-1} + \ldots + h_{M-1} \cdot x_{n-N+1}, \quad \text{Eq. (1)}$$

the coefficients need to be stored in the accelerator registers, ar0–ar7, 120. Specifically, ar0_0=h0, ar0_1=h1, and so on, where arX_Y denotes byte Y of register arX. The input samples are written sequentially into the registers of the delay chain 115 when an add instruction is executed. As shown in FIG. 5, writing into the first register (dr0) of the delay chain 115 automatically advances the delay chain 115, i.e., all registers drX are copied into registers dr(X+1) and then the new value is stored in dr0.

During each cycle, the FIR filter produces one output sample, which is written into the main register file 154. At the same time, the next input value is read from the main register file 152. Thus, the main data path only needs to copy the input samples from memory into a specific register 152 in the main register file and store the output samples into memory. No arithmetic operations are required in the main data path.

After M cycles, the filter has reached steady state and the delay chain 115 will contain the following values: dr0=xM−1, dr1=xM−2, −, dr(M−1)=x0. The accelerator now performs M MACs per cycle where M<16.

For the case when 17≦M≦32, a filter output has to be computed in two steps. Up to 32 coefficients can be stored in the accelerator registers 120. Note that h15 is stored in ar3_3 and h16 is stored in ar4_0. First, the next input sample is copied into the delay chain 115 and the accelerator 100 computes the partial result with the first 16 coefficients h0–h15. In the second cycle, the main data path idles. The accelerator 100 uses the feedback path 218 of the adder 210 to compute the final result with the remaining coefficients and the samples in dr16–dr(M−1). Thus, the throughput is M MACs per two cycles where 17≦M≦32.

Likewise, to calculate the cross correlation, Vxy, between two signal sequences, x(n) and y(n), the following equation is implemented by the accelerator 100:

$$\text{Vxy}(l) = \Sigma x(n+l)y(n), l=0, \pm 1, \pm 2, \text{ Eq.} \quad (2)$$

FIG. 5 illustrates a schematic block diagram of the accelerator 100 in the single-add mode. In addition to the elements previously described with reference to FIGS. 1 through 4, the accelerator 100 includes a source register pointer 510 and a destination register pointer 520. Generally, as previously indicated, the source register pointer and the destination register pointer determine the actual registers 152, 154 that are accessed in the main data path of the programmable processor 150. In a single-add mode, the destination register pointer 520 selects the register into which the adder output is written, i.e., the DRP contains the upper four bits of the register number.

In a single-add mode, power can be saved by not activating some of the adder inputs (and the corresponding multipliers) if less than 16 values need to be summed. The number of active adder inputs 525 contains the number of the left-most adder input that are active. For example, if the number of active adder inputs equals 13, then adder input 0 through 12 are active and adder inputs (and MULs) 13 through 15 are deactivated. It is noted that the state of input 16 (feedback path) is determined by a bit in the instruction. The reset value of the number of active adder inputs 525 is 15.

The repeat counter (rpc) 530 contains the number of times an add instruction is to be repeated if the add instruction has the appropriate bit set. The repeat counter (rpc) 530 is a 16-bit register and therefore add instructions can be repeated up to 65,536 times. When an instruction, movrpc, is issued, the repeat counter (rpc) 530 is loaded from the register 152 in the main register file that the source register pointer 510 points to, i.e., the src has to be set and the main data path must load a value into the corresponding register before the rpc is loaded. The repeat counter (rpc) 530 maintains its value until it is changed by another movrpc instruction, i.e., an add instruction does not change the contents of rpc to 0. The reset value of the repeat counter (rpc) 530 is equal to one.

The present invention contemplates a number of instructions for implementing certain features and functions of the accelerator 100. For example, instructions are required for compare and select operations, single-add, moving and clearing registers, zero overhead looping and exiting from the accelerator 100. Since the setup of registers in the accelerator 100, such as the delay chain 115, is not visible to the programmable processor 150, the accelerator 100 needs a clear register instruction. The instruction length is typically only 8 to 16 bits. Each of the operating modes discussed herein are controlled by appropriate bit settings in a correspond instruction. In addition, the programmable processor 150 requires instructions for starting the accelerator 100 and for moving values to the accelerator registers 120.

Figures 6, 7:
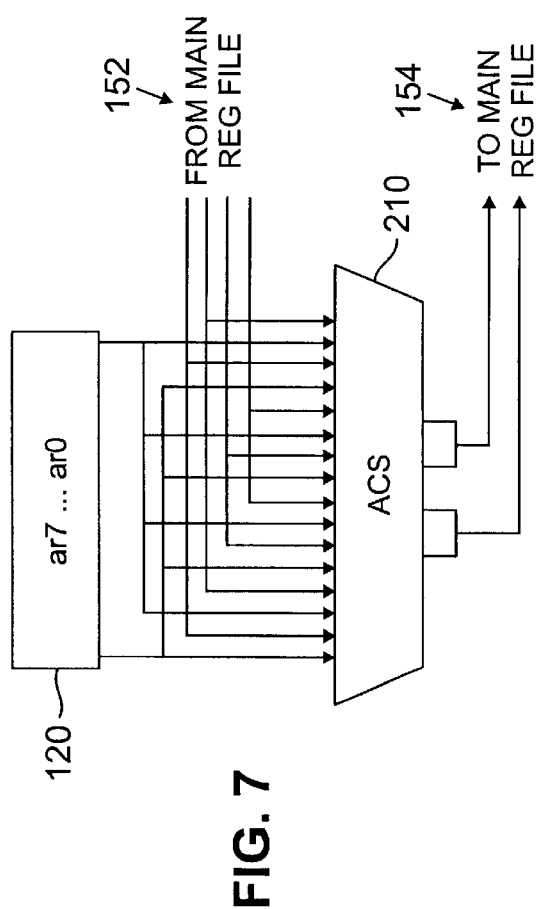
FIG. 6 outlines a representative cycle-by-cycle functioning of the accelerator of FIG. 4 when operating in the single-add mode.
FIG. 7 illustrates the accelerator in an ACS mode, in accordance with the present invention.

FIG. 6 illustrates the representative cycle-by-cycle functioning of the accelerator 100 when operating in the single-add mode. As shown in FIG. 6, during cycle 1, the accelerator 100 initially advances the delay chain 115 by one, reads a new value from the main register file 152, and writes the value into the first register (dr0) in the delay chain 115. During cycle 2, the 8 accelerator registers 120-0 through 120-7 are read and are applied to the inputs of the multipliers in the multiplier bank 220. In addition, the delay chain values are applied to the inputs of the multipliers in the multiplier bank 220, and the values are multiplied. During cycle 3, the outputs of the multipliers in the multiplier bank 220 are summed by the adder 210, with or without the feedback input. The feedback input is activated by a bit in the instruction whenever adding more than 16 values in the single-add mode. Finally, during cycle 4, the output of the adder 210 is written back to the main register file 154.

ACS MODE

FIG. 7 shows a schematic diagram of the accelerator 100 in the ACS mode, with only the portions of the accelerator 100 that are active in the ACS mode illustrated. While FIG. 7 is simplified to illustrate the concepts more clearly, a complete block diagram of an implementation of the accelerator 100 in the ACS mode is shown in FIG. 8. In addition to the elements previously described with reference to FIGS. 1 through 7, the accelerator 100 includes an accelerator register pointer 810 that selects the two bytes from the accelerator registers with the current branch metrics in the ACS mode. For example, if the accelerator register pointer 810 equals 0, then byte 0 and byte 1 from the accelerator register, ar0, 120-0 are selected. The accelerator register pointer 810 is either post-incremented or post-decremented after a multiple-add instruction. The reset value of the accelerator register pointer 810 is 0.

In an ACS mode, the source register pointer 510 selects the registers 152 in the main register file that contain the previous-state metrics. Two consecutive registers are selected and the source register pointer 510 contains the upper four bits of the register number. For example, if the source register pointer 510 equals 0b1101 (13), then registers 0b11010 (26) and 0b11011 (27) are selected. The reset value of the source register pointer 510 is 0.

In an ACS mode, two registers need to be selected and the destination register pointer 520 selects the lowest one. For example, if the destination register pointer 520 equals 0b1101 (13), then registers 0b11010 (26) and 0b11011 (27) are selected. The reset value of the destination register pointer 520 is 0.

Figure 10A:
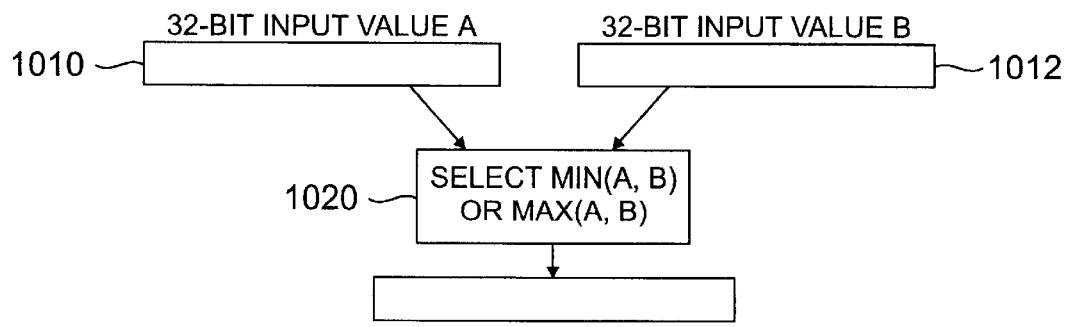
FIGS. 10A and 10B illustrate a compare operation for the Viterbi butterfly of FIG. 9, where a control circuit selects one or more minimum or maximum values.

In the ACS mode, the accelerator 100 can implement a Viterbi butterfly 900 as it is used in the IS-95 CDMA standard or NTT Wideband CDMA. As shown in FIG. 9, PS0 stands for the state cost (path metric) of the (previous) state 0, and NS0 stand for the state cost of the (next) state 0. Using Euclidean distances and antipodal signaling (i.e., incoming bits are coded as either +1 or −1), only one branch metric per butterfly 900 is necessary. To compute a complete state update for all 256 states in the IS-95 standard, the butterfly 900 has to be repeated so that the input states are (PS0, PS1); (PS2, PS3); . . . ; (PS254, PS255). The respective output states are then (NS0, NS128); (NS1, NS129); . . . ; (NS127, NS255). As shown in FIG. 9, the (next) state, NS0, for example, is equal to the minimum of (PS0+M0) and (PS0−M0). FIG. 10A illustrates a standard compare operation for the Viterbi butterfly 900, where a control circuit 1020 selects a minimum or maximum of two input values 1010, 1012.

The sequence of metrics for both the ⅓-rate and ½-rate codes exhibit a certain periodicity, so that only 2 sets of 16-branch metrics are required. The complete update is then computed in 8 loops with 16 iterations each. Since each branch metric can be represented in at most 8 bits, the total storage requirement is 32 * 8 bits, which fits into the 8 accelerator registers ar0 through ar7 (120-0 through 120-7) in packed format.

Figure 10B:
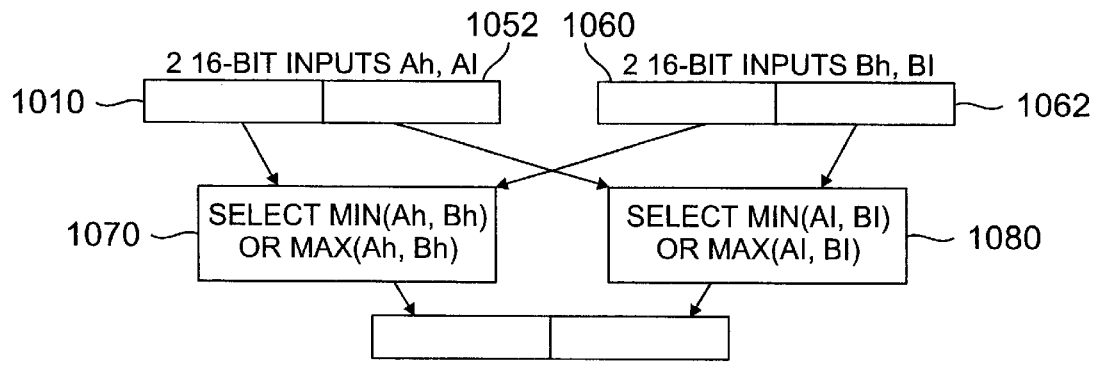

Two Viterbi butterflies 900 can be executed in parallel using the accelerator 100. The accelerator 100 computes the 8 16-bit additions (e.g., PS0+M0, PS1−M0, PS0−M0, PS1+M0 for the first butterfly 900 and PS2+M1, PS3−M1, PS2−M1, PS3+M1 for the second butterfly 900), and selects the minima of the 8 16-bit results using 2 split compare units 1070, 1080. The operation of such a split compare unit is shown in FIG. 10B. It is again noted that the two 16-bit values 1050, 1052 and 1060, 1062 in FIG. 10B are in packed format in 32-bit registers.

FIG. 11 illustrates the representative cycle-by-cycle functioning of the accelerator 100 when operating in the ACS mode. As shown in FIG. 11, during cycle 1, the accelerator 100 initially reads two values sign-extended by sign extenders 820, 830 (FIG. 8) from the accelerator registers 120 indicated by the accelerator register pointer 810. Simultaneously, two of the registers 152 from the main register file, indicated by the source register pointer 510 are read and the values are summed to form eight intermediate 16-bit outputs. The eight intermediate 16-bit outputs are paired and a maximum or minimum from each pair is selected during the second cycle, based on the current operating mode, to produce four values. These four values are concatenated into two 32-bit values and sent back during the third cycle to the register 154 in the main register file indicated by the destination register pointer 520 and the accelerator register pointer 810 is updated.

Implementation

As previously indicated, the present invention provides a design that allows both the FIR/correlation accumulation and the Viterbi computations to be performed using the same adder array 210 (including adders in the multiplier 220). A direct implementation does not achieve this since the additions are different: in the FIR/Correlation function, sixteen 16-bit products are reduced to a single sum, while the Viterbi ACS function requires 8 independent 16-bit additions. The multipliers 220 are also simplified by allowing carry-save outputs, thus eliminating the carry propagate addition in each multiplier 220.

Figure 14:
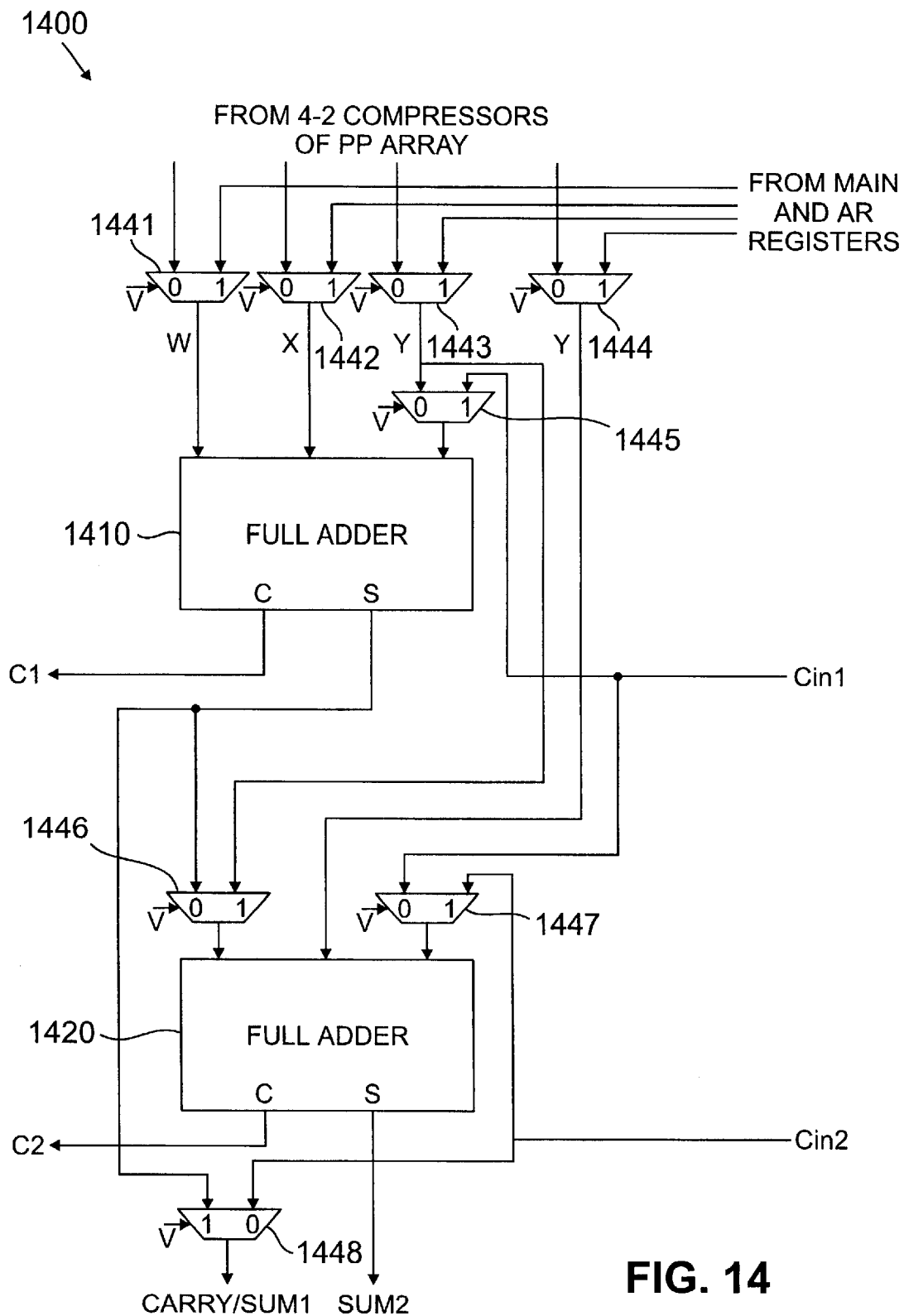
FIG. 14 illustrates a type 1 dual function cell implemented in the partial product arrays of FIG. 13 for each bit position.

FIG. 12 shows the 4 partial products A, B, C and D, each having a length of 9 bits including the sign (S), for an 8×8 radix-4 Booth multiplier. The fifth term occurs as a result of the complementing bit (CD) and the elimination of the sign extension bits. The accumulation of the 5th term (01010110CD) reduces to shifting the constant part (01010110) 4 bit positions to the left and summing the CD bits, (01100000+[Sum of CD]). Thus, the sixteen 5th terms reduce to a single term. FIG. 13 shows the entire scheme. The direct approach would first add the partial products to form the final 16-bit product in each multiplier 220, and then add sixteen 16-bit products in an adder array 210. The additions can also be done as shown in FIG. 13, where the partial products A,B,C, D are added in 4 identical arrays, PPA, PPB, PPC and PPD (1310, 1312, 1314 and 1316), where each array (1310, 1312, 1314 and 1316) is embodied as three levels of 4–2 compressors. As discussed below, the third level of 4–2 compressors is shown in FIG. 14.

The scheme shown in FIG. 13 implements the addition computations required for the FIR and correlation algorithms. According to a feature of the present invention, the third level of 4–2 compressors in each of the arrays, PPA, PPB, PPC and PPD (1310, 1312, 1314 and 1316) are modified as shown in FIG. 14 to operate as a twin adder to also implement the additions required for the Viterbi algorithm.

As shown in FIG. 13, each array 1310–1316 outputs a sum and a carry of 16 bits each (only 13 bits are required for single-add mode). The four sum and four carry terms are then reduced to two terms by an n-to-2 compressor/c-s 1320 and latched (along with the CD term) in the first pipeline register 1340. The n-to-2 compressor/c-s 1320 consists of two levels of 4–2 compressors and is discussed further below in conjunction with FIG. 15. As discussed below, the n-to-2 compressor/c-s 1320 operates as an 8-to-2 compressor in one mode, and as a compare-selector (c-s) in a second mode. The multiple mode adder of FIG. 13 also includes a final stage adder 1330, such as a 4-to-2 compressor followed by a carry-propagate adder (CPA) that produces a final sum, which is latched in the second pipeline register 1350. The first pipeline register 1340 can be placed at the interface between the n-to-2 compressor/c-s 1320 and the final stage adder 1330.

The Viterbi computation consists of three sub-computations: add, compare and select. The addition computation requires eight 16-bit adders to add the path metrics to the branch metrics for four states. Each of the four partial product arrays PPA, PPB, PPC, PPD (FIG. 13) has a final stage of 4-to-2 compressors (FIG. 14) that produce sum and carry outputs. For Viterbi addition, the 4-to-2 adder cells 1410, 1420 are modified as shown in FIG. 14, to allow dual functions.

As shown in FIG. 14, the control signal, V, determines whether the dual function cell 1400 operates in a first mode as a 4-to-2 compressor for FIR and correlation computations, or in a second mode as two separate adders for Viterbi addition. If the value of the control signal, V, is set to zero, the outputs of the 4-to-2 compressors in the previous stages of the 16-to-2 compressor PPA, PPB, PPC, PPD are routed by means of the zero inputs of the multiplexers 1441–1444 to the cell inputs W, X, Y, Z for 4-to-2 compression. If the value of the control signal, V, is set to one, then the values are taken from the main registers and accelerator registers (AR) by means of the one inputs of the multiplexers 1441–1444 and the cell 1400 performs two separate additions.

Figure 15:
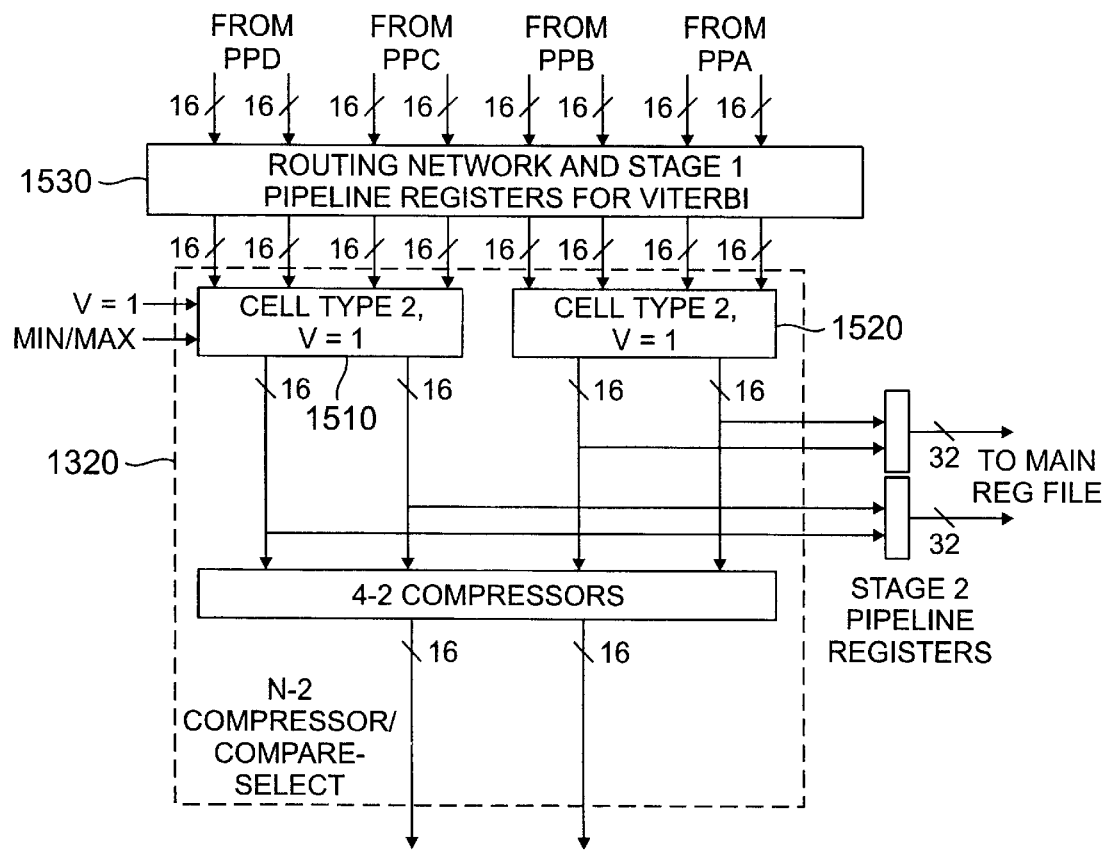
FIG. 15 illustrates a compare-select operation implemented in the n-to-2 compressor/compare-select unit of FIG. 13.

FIG. 15 shows how the compare and select computations are performed in the n-to-2 compressor/c-s 1320 (FIG. 13). The array 1320 has a first level of 4–2 compressors generally referred to as type 2 cells 1510, 1520 that can perform two functions. The type 2 cells 1510, 1520 are discussed further below in conjunction with FIG. 16. For the FIR/correlation computation, the cells 1510, 1520 function as 4-to-2 compressors selected by setting the value of the control function, V, to zero. If the value of the control function, V, is set to one, the cells 1510, 1520 perform the Viterbi compare and select function. FIG. 15 also shows a routing network 1530 to pair the appropriate metrics for comparison, and the first stage pipeline registers. When the value of the control function, V, is set to zero, the routing network 1530 simply passes the values straight through. When the value of the control function, V, is set to one, the routing is done and the values are latched.

Figure 16:
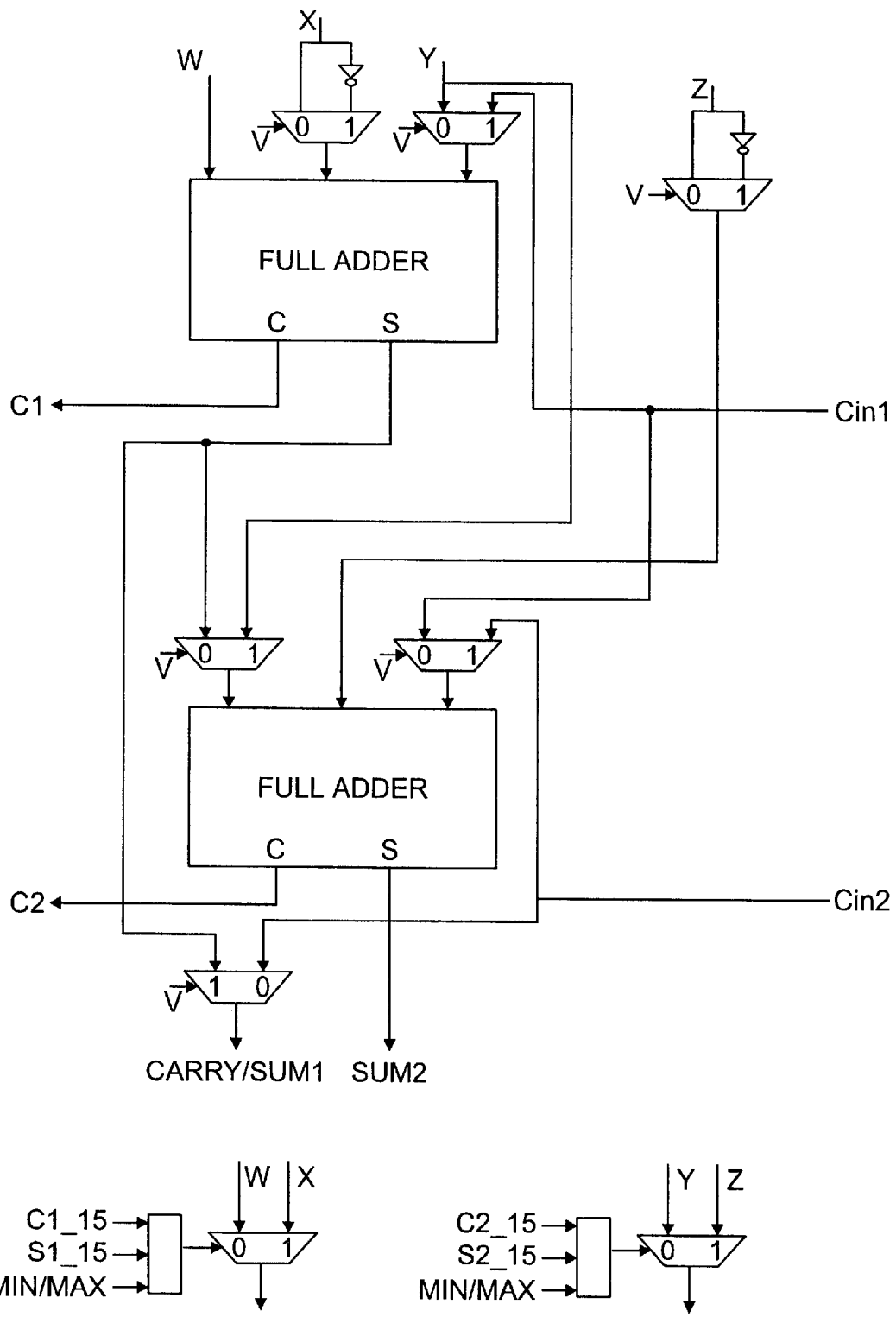
FIG. 16 illustrates the type 2 dual function cell of FIG. 15 for each bit position.

In order to implement the compare and select computations, the type 2 cells 1510, 1520 perform two independent subtractions, as shown in FIG. 16, and select the minimum or maximum as controlled by the min/max signal (derived from the instruction). The signals, C1_15 and S1_15 are the carry out and sum signals, respectively, of the first adder at bit position 15. Similarly, the signals, C2_15 and S2_15 are the carry out and sum signals, respectively, of the second adder. The first adder computes W minus X and the second adder computes Y minus Z. The sign of the subtraction results (C1, S1 and C2, S2) indicate which input value is larger. It is noted that the Cin1 and Cin2 to the bit zero position are set to one when the value of the control function, V, is set to one.

It is to be understood that the embodiments and variations shown and described herein are merely illustrative of the principles of this invention and that various modifications may be implemented by those skilled in the art without departing from the scope and spirit of the invention.

We claim:

1. A programmable multi-mode accelerator for use with a programmable processor, comprising:
a multiple-mode adder that can be configured to add a plurality of partial product inputs to obtain a single result in a first mode or to perform a plurality of independent additions on said inputs to obtain a plurality of results in a second mode.

2. The accelerator of claim 1, wherein said accelerator implements low-precision algorithms requiring primarily addition or multiply-add computations.

3. The accelerator of claim 1, wherein said first mode sums a plurality of inputs to form one n bit output.

4. The accelerator of claim 3, wherein one of said inputs is a feedback path and the other inputs come from a multiplier bank.

5. The accelerator of claim 1, further comprising circuitry for comparing the results of said independent additions in said second mode and for selecting a minimum or maximum result.

6. The accelerator of claim 1, wherein said second mode divides a plurality of inputs into groups of two inputs each, adds the two inputs of each group to form intermediate outputs, selects a minimum or maximum value from each pair of intermediate outputs, concatenates the minimum or maximum values into two values and stores the two values in a register file.

7. The accelerator of claim 1, wherein said first mode implements a finite impulse response (FIR) computation.

8. The accelerator of claim 1, wherein said first mode implements a correlation computation.

9. The accelerator of claim 1, wherein said second mode implements a Viterbi computation.

10. The accelerator of claim 1, wherein said operands are obtained from a register file of a programmable processor.

11. The accelerator of claim 10, wherein said operands are obtained from a register file identified by a source register pointer.

12. The accelerator of claim 1, wherein said results are written to a register file of a programmable processor.

13. The accelerator of claim 12, wherein said results are written to a register file identified by a destination register pointer.

14. The accelerator of claim 1, wherein said results are written to a memory-mapped register.

15. The accelerator of claim 1, further comprising a delay line that is operable during said first mode to produce delays of $z^{-1}$ or $z^{-2}$.

16. The accelerator of claim 1, further comprising a repeat counter that indicates the number of times an add instruction is to be repeated by said multiple-mode adder.

17. The accelerator of claim 1, wherein said accelerator is initiated by a start instruction issued by said programmable processor.

18. The accelerator of claim 1, wherein said accelerator terminates execution by executing an exit instruction.

19. A multiple-mode adder to perform computations requiring a single-addition of a plurality of partial product inputs in a first mode or multiple parallel additions of a plurality of adder inputs in a second mode, said multiple-mode adder including a plurality of partial product arrays, each of said arrays comprising:
a first full adder having three inputs, a carry output and a sum output, at least one of said inputs having a multiplexer that selects between one of said adder inputs and a first carry-in value;
a second full adder having three inputs, a carry output and a sum output, a first one of said inputs having a multiplexer that selects between one of said adder inputs and said sum output of said first adder and a second one of said inputs having a multiplexer that selects between said first carry-in value and a second carry-in value; and
a control input that determines whether said adder operates in said first single-addition mode or in said second multiple parallel additions mode by configuring the state of said multiplexers.

20. The multiple-mode adder of claim 19, wherein each of said three inputs of said first full adder have a multiplexer that selects between (i) the outputs of a previous stage or (ii) values taken from one or more registers.

21. The multiple-mode adder of claim 19, wherein each of said plurality of arrays produce a sum and a carry term, and said multiple-mode adder further comprises an n-to-2 compressor/compare-selector.

22. The multiple-mode adder of claim 21, wherein said n-to-2 compressor/compare-selector further comprises a multi-mode cell operational in said second mode to compare the results of said independent additions and to select a minimum or maximum result.

23. The multiple-mode adder of claim 22, wherein said multi-mode cell performs said compare and select operation using a subtraction operation and selects a minimum or maximum based on a control signal.

24. The multiple-mode adder of claim 21, wherein said n-to-2 compressor/compare-selector further comprises a multi-mode cell operational in said first mode to compress said plurality of sum and carry terms to a carry and a sum output.

25. The multiple-mode adder of claim 24, further comprising a final stage adder for reducing said carry and a sum output to a final sum.

26. The multiple-mode adder of claim 25, wherein said final stage adder comprises an n-to-2 compressor and a carry propagate adder (CPA).

27. The multiple-mode adder of claim 19, wherein said first mode implements a finite impulse response (FIR) computation.

28. The multiple-mode adder of claim 19, wherein said first mode implements a correlation computation.

29. The multiple-mode adder of claim 19, wherein said second mode implements a Viterbi computation.

30. A multiple-mode adder to perform computations requiring a single-addition of a plurality of partial product inputs in a first mode or multiple parallel additions of a plurality of adder inputs in a second mode, said multiple-mode adder including a plurality of partial product arrays, each of said arrays comprising:
  a first adder having a plurality of inputs, a carry output and a sum output, at least one of said inputs having a multiplexer that selects between a plurality of input values;
  a second adder having a plurality of inputs, a carry output and a sum output, at least one of said inputs having a multiplexer that selects between a plurality of input values; and
  a control input that determines whether said adder operates in said first single-addition mode or in said second multiple parallel additions mode by configuring the state of said multiplexers.

31. The multiple-mode adder of claim 30, wherein said multiplexers select between (i) the outputs of a previous stage or (ii) values taken from one or more registers.

32. The multiple-mode adder of claim 30, wherein each of said plurality of arrays produce a sum and a carry term, and said multiple-mode adder further comprises an n-to-2 compressor/compare-selector.

33. The multiple-mode adder of claim 32, wherein said n-to-2 compressor/compare-selector further comprises a multi-mode cell operational in said second mode to compare the results of said independent additions and to select a minimum or maximum result.

34. The multiple-mode adder of claim 33, wherein said multi-mode cell performs said compare and select operation using a subtraction operation and selects a minimum or maximum based on a control signal.

35. The multiple-mode adder of claim 32, wherein said n-to-2 compressor/compare-selector further comprises a multi-mode cell operational in said first mode to compress said plurality of sum and carry terms to a carry and a sum output.

36. The multiple-mode adder of claim 35, further comprising a final stage adder for reducing said carry and a sum output to a final sum.

37. The multiple-mode adder of claim 36, wherein said final stage adder comprises an n-to-2 compressor and a carry propagate adder (CPA).

38. The multiple-mode adder of claim 30, wherein said first mode implements a finite impulse response (FIR) computation.

39. The multiple-mode adder of claim 30, wherein said first mode implements a correlation computation.

40. The multiple-mode adder of claim 30, wherein said second mode implements a Viterbi computation.

41. A programmable processor system, comprising:
  a programmable processor; and
  a programmable accelerator coupled to said programmable processor for performing one or more low-precision algorithms, said programmable accelerator further comprising:
    a multiple-mode adder that can be configured to add a plurality of partial product inputs to obtain a single result in a first mode or to perform a plurality of independent additions on said inputs to obtain a plurality of results in a second mode.

42. The programmable processor system of claim 41, wherein said accelerator performs said algorithms at a higher data rate than is achievable with said programmable processor.

43. The programmable processor system of claim 41, wherein said algorithm is a finite impulse response (FIR) computation, and said multiple-mode adder includes a plurality of low-precision multipliers.

44. The programmable processor system of claim 41, wherein said algorithm is a correlation computation and said multiple-mode adder includes a plurality of low-precision multipliers.

45. The programmable processor system of claim 41, wherein said algorithm is a Viterbi computation and said multiple-mode adder includes a plurality of twin adders.

46. A multiple-mode adder to perform computations requiring a single-addition of a plurality of partial product inputs in a first mode or multiple parallel additions of a plurality of adder inputs in a second mode, said multiple-mode adder including a plurality of partial product arrays, each of said arrays comprising:
  a first adder having a plurality of inputs, a carry output and a sum output, at least one of said inputs having a multiplexer that selects between a plurality of input values;
  a second adder having a plurality of inputs, a carry output and a sum output, at least one of said inputs having a multiplexer that selects between a plurality of input values;
  a multi-mode cell operational in said first mode to compress said plurality of sum and carry terms and operational in said second mode to compare the results of said independent additions and to select a minimum or maximum result; and
  a control input that determines whether said first and second adders operate in said first single-addition mode or in said second multiple parallel additions mode by configuring the state of said multiplexers and whether said multi-mode cell operates in said first or second mode.

47. The programmable processor system of claim 46, wherein said algorithm is a finite impulse response (FIR) computation.

48. The programmable processor system of claim 46, wherein said algorithm is a correlation computation.

49. The programmable processor system of claim 46, wherein said algorithm is a Viterbi computation.

50. An integrated circuit comprising:

a programmable multi-mode accelerator for use with a programmable processor, said programmable multi-mode accelerator further comprising:

a multiple-mode adder that can be configured to add a plurality of partial product inputs to obtain a single result in a first mode or to perform a plurality of independent additions on said inputs to obtain a plurality of results in a second mode.

51. The integrated circuit of claim 50, wherein said integrated circuit further comprises a digital signal processor (DSP).

52. The integrated circuit of claim 50, wherein said integrated circuit further comprises a microprocessor.

53. The integrated circuit of claim 50, wherein said integrated circuit further comprises a microcontroller.

54. An integrated circuit comprising:

a multiple-mode adder to perform computations requiring a single-addition of a plurality of partial product inputs in a first mode or multiple parallel additions of a plurality of adder inputs in a second mode, said multiple-mode adder including a plurality of partial product arrays, each of said arrays comprising:

a first adder having a plurality of inputs, a carry output and a sum output, at least one of said inputs having a multiplexer that selects between a plurality of input values;

a second adder having a plurality of inputs, a carry output and a sum output, at least one of said inputs having a multiplexer that selects between a plurality of input values; and a control input that determines whether said adder operates in said first single-addition mode or in said second multiple parallel additions mode by configuring the state of said multiplexers.

55. The integrated circuit of claim 54, wherein said integrated circuit further comprises a digital signal processor (DSP).

56. The integrated circuit of claim 54, wherein said integrated circuit further comprises a microprocessor.

57. The integrated circuit of claim 54, wherein said integrated circuit further comprises a microcontroller.

58. An integrated circuit comprising:

a programmable processor; and a programmable accelerator coupled to said programmable processor for performing a plurality of low-precision algorithms, said programmable accelerator further comprising:

a multiple-mode adder that can be configured to add a plurality of partial product inputs to obtain a single result in a first mode or to perform a plurality of independent additions on said inputs to obtain a plurality of results in a second mode.

59. The integrated circuit of claim 58, wherein said integrated circuit further comprises a digital signal processor (DSP).

60. The integrated circuit of claim 58, wherein said integrated circuit further comprises a microprocessor.

61. The integrated circuit of claim 58, wherein said integrated circuit further comprises a microcontroller.

* * * * *